(No Model.) 2 Sheets—Sheet 1.

R. SCHMIDT.
TELESCOPE IN COMBINATION WITH COMPASSES.

No. 567,867. Patented Sept. 15, 1896.

WITNESSES:

INVENTOR
Robert Schmidt
BY
ATTORNEY (No Model.) 2 Sheets—Sheet 2.
R. SCHMIDT.
TELESCOPE IN COMBINATION WITH COMPASSES.
No. 567,867. Patented Sept. 15, 1896.
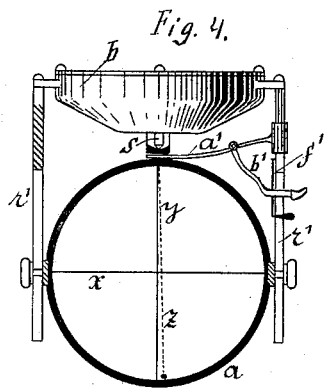
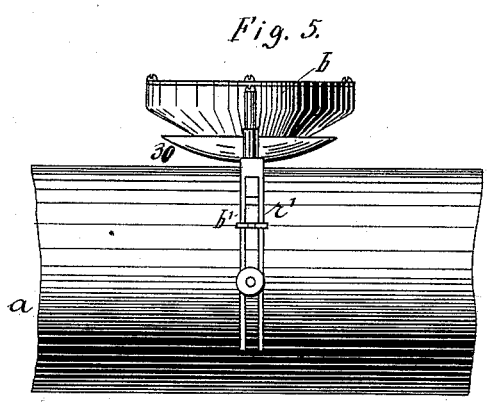
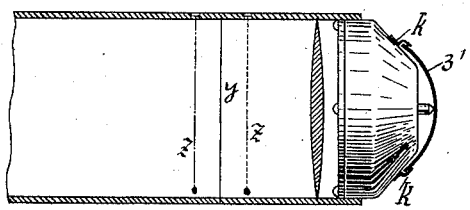
WITNESSES:
INVENTOR
Robert Schmidt
BY
ATTORNEY

UNITED STATES PATENT OFFICE.

ROBERT SCHMIDT, OF LINDAU, GERMANY.

TELESCOPE IN COMBINATION WITH COMPASSES.

SPECIFICATION forming part of Letters Patent No. 567,867, dated September 15, 1896.

Application filed December 2, 1895. Serial No. 570,850. (No model.)

*To all whom it may concern:*

Be it known that I, ROBERT SCHMIDT, a subject of the King of Bavaria, and a resident of Lindau, in the Kingdom of Bavaria, German Empire, have invented certain new and useful Improvements in Telescopes in Combination with Compasses, of which the following is a full, clear, and exact description.

According to the present invention a compass is combined with a telescope or field-glass, so as to enable the observer to determine the magnetic direction of the object fixed toward the horizontal plane by means of an arresting device and to read off the same either at once or subsequently. The device consists of the details of construction as hereinafter particularly described; and in order to render the present specification more easily intelligible reference is had to the accompanying drawings, in which similar letters and numerals denote similar parts throughout the several views.

Figure 1:
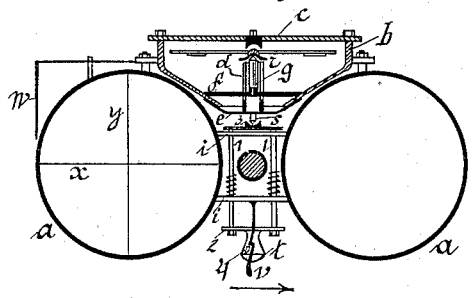
Figure 3:
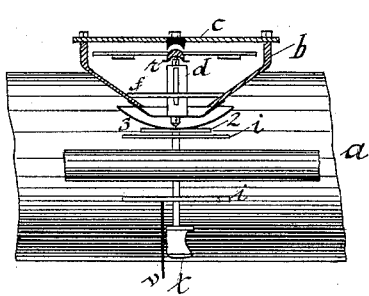
Figure 2:
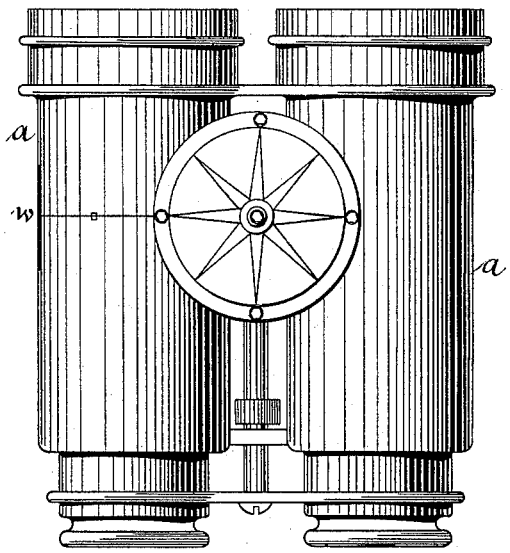

Figure 1 shows a transverse section through a field or navy glass; Fig. 2, a plan of Fig. 1; Fig. 3, a part longitudinal section through the compass. Fig. 4 is a longitudinal section through a device of the kind in combination with a telescope; Fig. 5, a part side elevation of Fig. 4, and Fig. 6 a part longitudinal section showing how the compass may be used to close the end of the telescope-tube.

Referring to Figs. 1 to 3, the casing $b$ of the compass is rigidly fixed by means of short arms between the tubes $a\,a$ of the field-glass, said casing being provided with a glass cover $c$, screwed thereto, and an elastic bottom, to which is attached a vertical slotted sleeve $d$, extending inwardly of the casing, and a pin $s$, projecting downwardly outside of the same. The stationary center-pin carrier $f$ of the compass is guided in the slots of the sleeve $d$ and carries at its center the pin $g$, on which is arranged the rose of the compass, with its magnet, on the cap $r$, having at the top a rubber cushion fitting a seating in the glass cover $c$. Below the casing $b$ is fixed to the tubes $a\,a$ an arresting-frame, guided in the slotted plates $i\,i$ by means of vertical rods 1 1, connected by the upper and lower cross-bars 2 2. The upper bar of the latter is provided with a seating 3 for the end of the pin $s$, and the rods 1 1 have spiral springs which have a tendency to push the seating 3 upward against the lower end of the pin $s$. The lower bar 2 carries a button $t$, flattened at the side turned toward the ocular glasses and having a nose 4, adapted to engage the spring $v$. A telltale $w$ is fixed at the side of the compass, which shows the amplitude of the swing of the compass in the horizontal plane. X and Y represent crossed lines on the object-glass.

The arresting or fixing device operates in the following manner: The frame 1 1 2 2 is retained at its lower position by the spring $v$ and nose 4, so that the compass-dial is free to swing. The observer will be able to see objects at a certain angle above and below the horizontal plane without inclining the compass. If the object fixed is at the point where the lines X Y cut, and the observer presses the spring $v$ in the direction of the arrow, at this moment the frame 1 1 2 2 springs upwardly, pushing up the elastic bottom $e$, with the sleeve $d$, the upper edge of the latter contacting with the cap $r$ and pushing this, with its rubber top, against the seating arranged in the glass cover $c$. As the compass is thus raised from the center pin and pushed fast against the upper seating, neither the rose nor the casing $b$ can move. Thus the angle to the horizontal plane can be read from the telltale $w$ and the magnetic direction from the rose of the compass. Figs. 4 and 5 show a modification of this arrangement. In this case the compass is attached to the telescope-tube by means of the slotted arms $r'$. On one arm a spring $a'$ is attached, which has a tendency to press the pan 30 upward against the pin $s$. This spring is provided with a lever $b'$, guided at its lower end in a slot of $r'$. If the lever $b'$ is pulled down, the spring $a'$ will be stretched, and in order to retain the spring in this position a second spring $f'$ is provided, along which the lower end of $b'$ slides, and which is provided with a pin adapted to retain the said spring $b'$. If the spring $f'$ is pushed aside, the end of the spring $b'$ will be released, and the spring $a'$ springs upwardly, fixing the compass in the same manner as described with regard to Figs. 1 to 3. As may be seen from Fig. 6, in this case a thread or metallic pendulum $z$ is here arranged before or behind the vertical line Y of the cross at the end of the telescope in order to show when the telescope is being held in the proper position. As shown at Fig. 6, a spring-pan 31 may be arranged, the ends of which may be retained against the casing by means of catches *k k* and then the casing of the compass employed as a protective disk for the lens of the telescope.

I claim as my invention—

1. In combination with a field-glass, a compass the casing of which is mounted between the tubes of said glass, an elastic bottom to said casing, a slotted sleeve extending inwardly of said casing and a pin extending downwardly and outwardly of the same, a spring-pressed frame mounted beneath said pin and normally engaging the same and means for keeping said frame out of engagement with the pin and releasing the same when desired, a vertically-sliding dial mounted within said sleeve a seating at the inner side of the compass-glass and against which the said dial is actuated on the release of the frame substantially as described.

2. The combination of a field-glass and a compass mounted between the tubes of the same, a telltale *w* attached to said compass, a vertically-movable dial therein and elastic bottom to said compass on which the dial is mounted, and means for operating said bottom inwardly toward the compass-cover, a seating on the inner side of the compass-glass against which said dial engages in the manner and for the purpose substantially as described and shown.

In witness whereof I have hereunto signed my name in the presence of two subscribing witnesses.

ROBERT SCHMIDT.

Witnesses:
JAMES LEONARD CORNINO,
EMIL HENZEL.